Patented Oct. 15, 1940

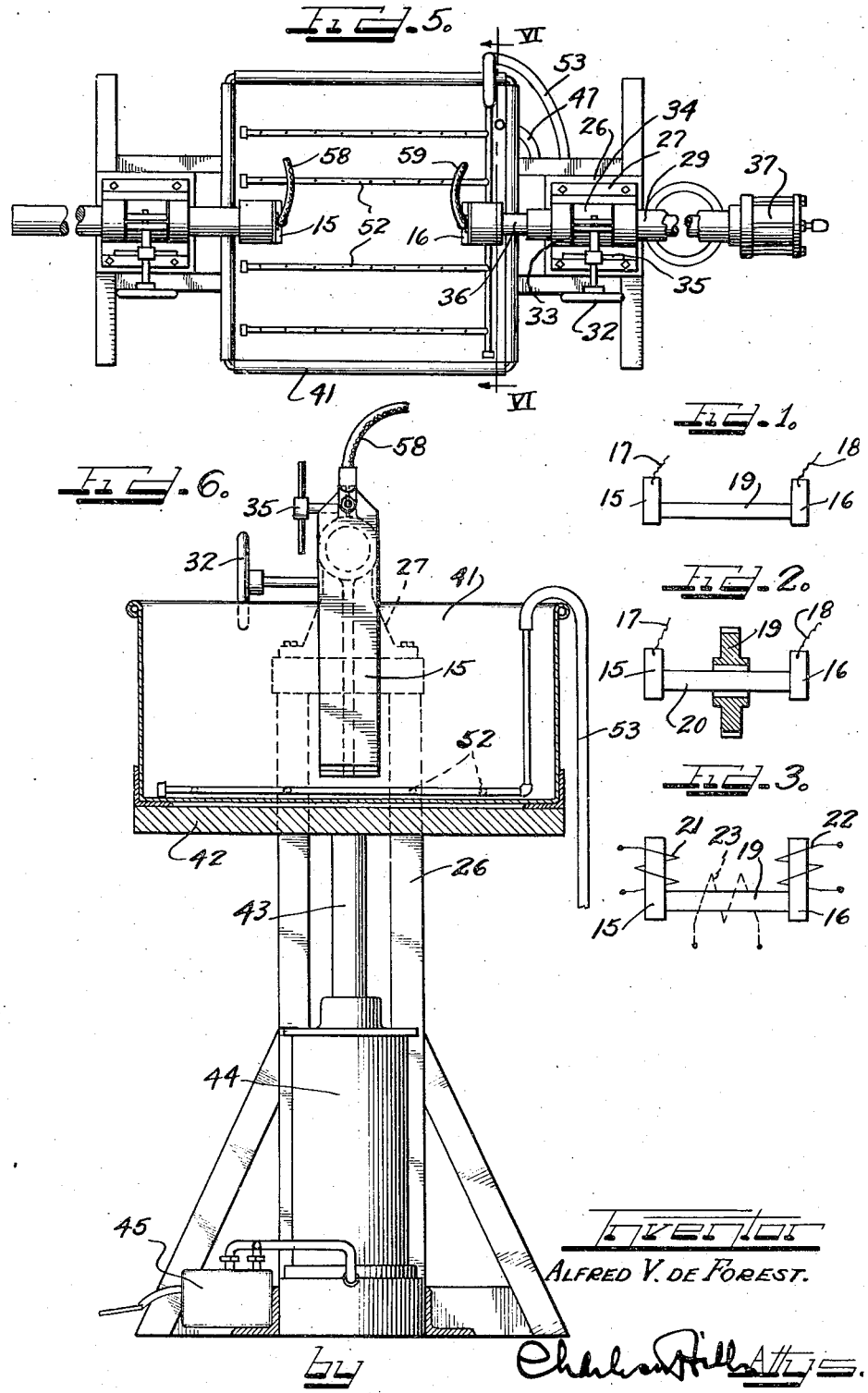

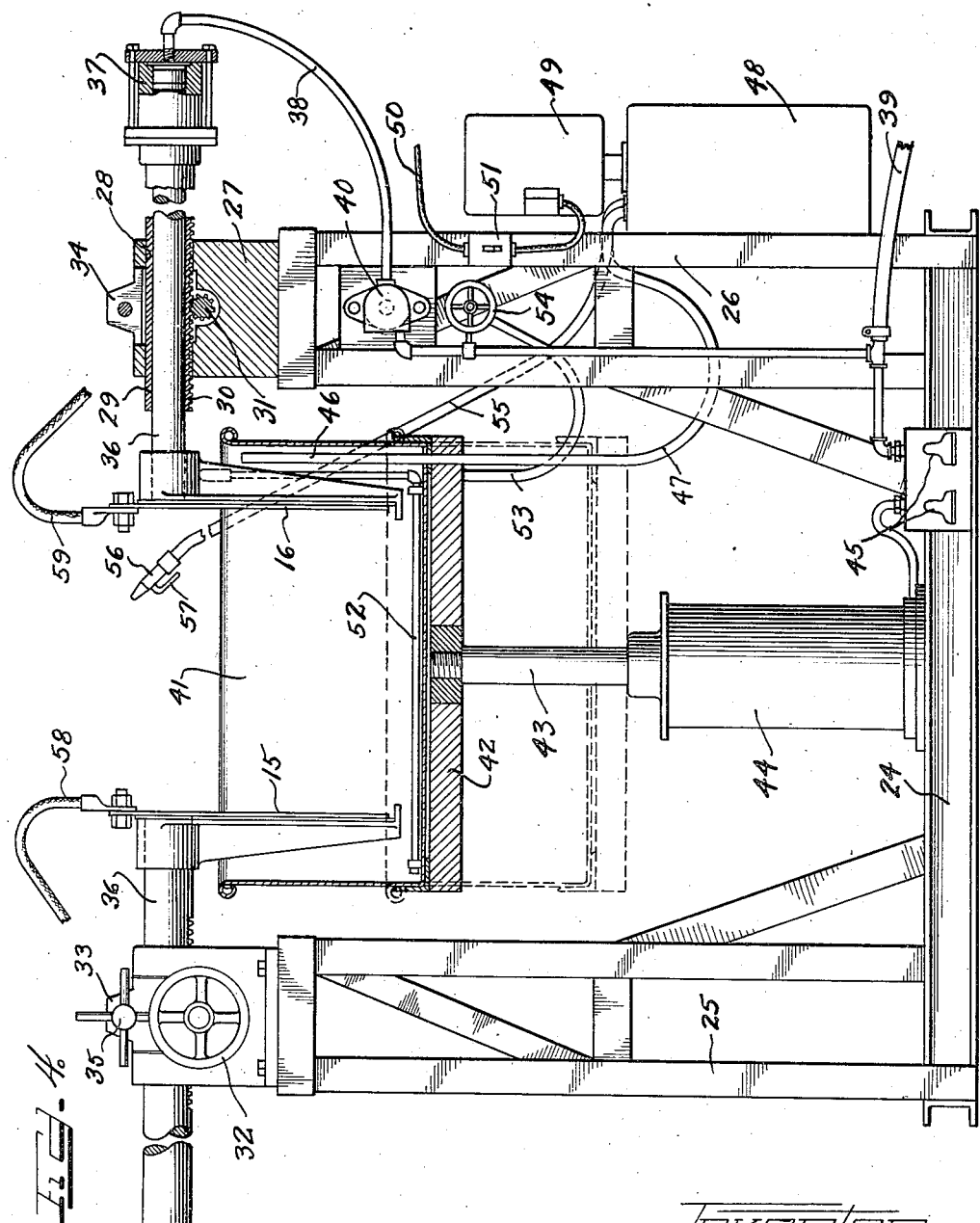

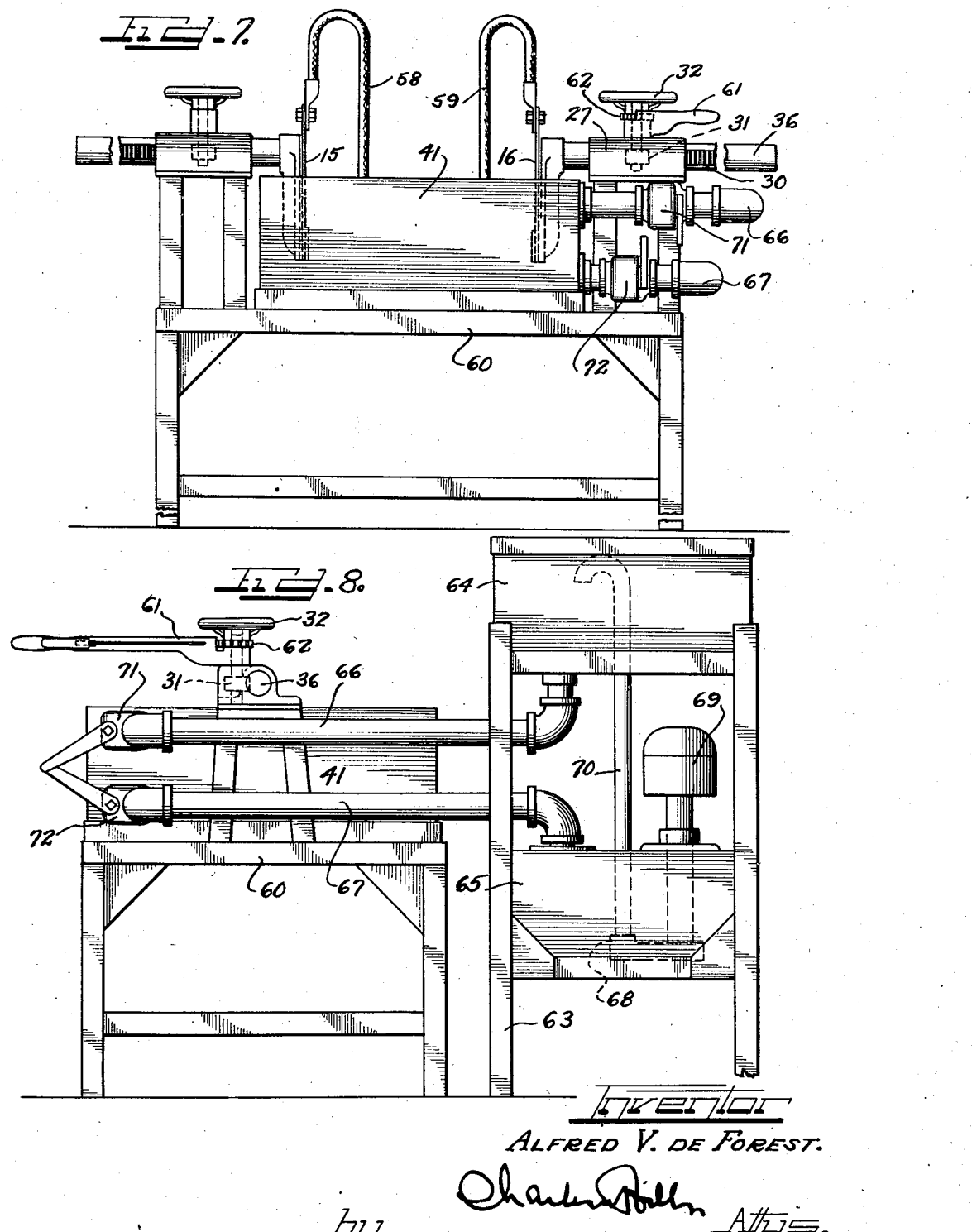

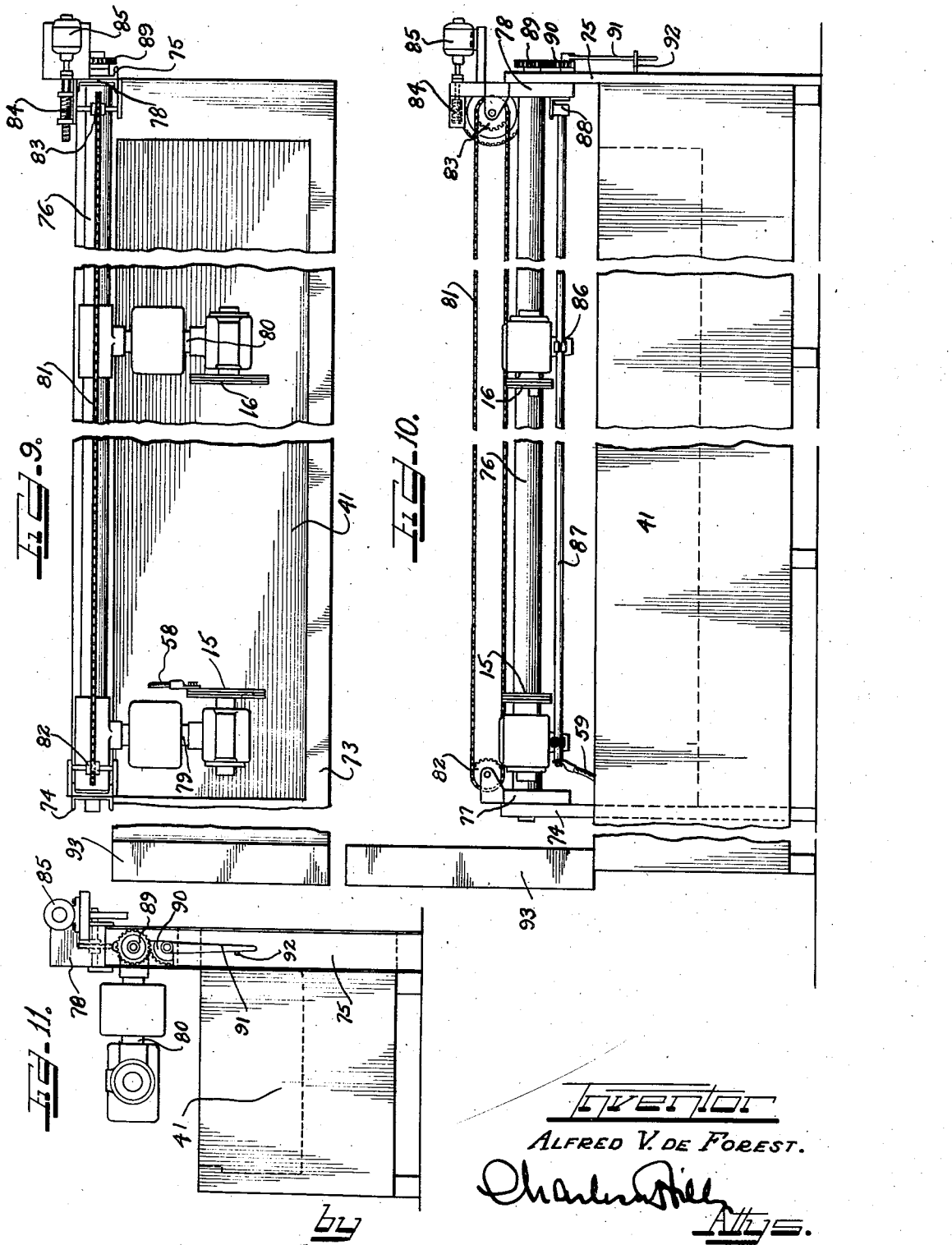

2,217,733

UNITED STATES PATENT OFFICE 2,217,733

APPARATUS FOR ELECTROMAGNETIC TESTING OF PARAMAGNETIC MATERIALS

Alfred V. de Forest, Marlboro, N. H., assignor, by mesne assignments, to Magnaflux Corporation, Chicago, Ill., a corporation of Delaware Application November 8, 1937, Serial No. 173,426

7 Claims. (Cl. 175—183)

The present invention is in general concerned with novel means for testing paramagnetic materials for flaws, cracks, discontinuities of any kind, strains, etc., and is particularly concerned with improved apparatus which will enable the carrying out of the testing operations in a convenient and dependable manner, this apparatus being very flexible of operation.

It has heretofore been known that an object may be tested for flaws, cracks, discontinuities and the like by subjecting the object to the influence of a magnetic field, while it is in contact with finely divided particles of magnetic material. These particles will indicate the existence and degree of deviation of the lines of flux from their theoretical path and cause the particles to cling to the surface of the object at regions thereof where discontinuities or other defects exist, by reason of the magnetic polar effects exhibited by the object with their consequential leakage lines of flux.

As an improvement in the foregoing manner of testing objects for defects, it has been shown previously in the prior art that advantageous results may be obtained by suspending the particles in a fluid medium and surrounding the object by the fluid holding the particles in suspension. Under such conditions, when the object is subjected to the influence of a magnetic field, either by passing current through the object or by electromagnetically or otherwise setting up lines of flux in the object as by placing it in a magnetic field; the suspended readily mobile particles in the regions of the flaws, cracks, discontinuities, etc., will be drawn to the surface of the object. In the other regions of the object, the magnetic lines pass through the object within the surface thereof and therefore do not disturb the statical condition of the suspended particles, or at least not to the same extent or with the same result.

It is ordinarily impractical to establish either magnetic contact or electrical contact with an object, where the contact surfaces are permanently immersed in a liquid. In the present invention, it is therefore contemplated as a primary object to provide means whereby contact may be established with the test object before it is immersed or placed below the level of the liquid.

Experiment in this type of testing has further revealed that, if the object be withdrawn from the liquid without interrupting the magnetic field, a smaller defect may be detected than in the case where the magnetic field is removed or interrupted before the withdrawal of the object from the liquid.

The present invention therefore contemplates improved means, whereby the test object may be withdrawn from the liquid bath either before or after removing the magnetic field to which it is being subjected, depending upon whether or not the utmost refinement is necessary or desirable. In the case where the magnetizing field is maintained during the time the object is removed from the liquid, indications of the lack of magnetic homogeneity which are not due to mechanical defects in the metal, may readily be observed. For example, ferrite grain boundaries or cementite grain boundaries may readily be distinguished by the practice of my improved method. Likewise, effects produced by residual stresses, or the disturbance to the magnetic properties caused by deformation beyond the elastic limit may also be observed.

In my improved apparatus, the magnetizing field may be produced so as to pass longitudinally of the part either by placing a coil or winding around the part to be tested, or by placing magnetizing windings on the contacts which are utilized for holding the object while it is being tested. A circular magnetization may, if desired, be produced either by passing current through the part itself or by passing current through a conductor which passes through a hole in the part. Such a direction of magnetization is chosen as will produce a magnetic field which intersects the defect or the magnetic inhomogeneity at an angle other than 180°. This is equivalent to saying that the magnetic field must not be parallel to the defect or the inhomogeneity for the detection of which the test is used. It will therefore be apparent that in some cases it may be necessary to inspect the material, first, under one condition of magnetization and, second, after the direction of magnetization has been changed. The magnetization may be produced either by an alternating current, direct current, or an interrupted or pulsating direct current.

My improved apparatus may also be used to advantage for the testing of the present of paramagnetic areas in otherwise non-magnetic alloys, such as certain types of stainless steel, notably that consisting in a low carbon—18% chrome—8% nickel—or similar related alloys. Further, such alloys as high-speed steel may be tested to show the condition, heat treatment and grain structure.

It is a further object of the invention to provide in an apparatus of the type described herein, improved means for contacting and supporting the test object while it is being tested.

Another object is to provide an impoved arrangement whereby the contacts may be roughly adjusted by hand so as to initially contact and support the test object, but which may thereafter be further actuated by power means to increase the contact pressure and assure a more positive engagement of the contacts with the test object.

Another object of the invention is the provision of improved means for immersing the test object in the liquid bath and thereafter removing the object from the bath, either while being subjected to the influence of a magnetic field or after it has been discontinued.

Still another object is to provide means whereby the test object may be subjected to circular magnetization.

Other objects and features of the invention will more fully appear from the following detailed description taken in connection with the accompanying drawings, which illustrate several embodiments thereof, and in which:

Figures 1, 2 and 3 diagrammatically illustrate several ways in which the test object may be supported and subjected to the influence of a magnetic field;

Figure 4 is an elevational view partly in section of one form of apparatus which may be utilized for practicing the herein described invention;

Figure 5 is a plan view of the same;

Figure 6 is a vertical sectional view taken through the apparatus substantially on line VI—VI of Figure 5;

Figure 7 is an elevational view of apparatus of different construction for practicing the features of the present invention;

Figure 8 is an end view of the same;

Figure 9 is a plan view of apparatus embodying a still different construction;

Figure 10 is an elevational view of the same; and

Figure 11 is an end view.

As shown on the drawings:

In general, the present invention contemplates apparatus which is so arranged that contacts may be brought into engagement with the test object, while the contacts are in the air. The contacts and object are then submerged in the liquid carrying finely divided particles. While the test object is in the liquid, it is subjected to a magnetizing force, and the contacts together with the object may be withdrawn while the magnetizing force continues or may be withdrawn after the magnetizing force has been discontinued.

It will be readily apparent that there are a number of ways in which the immersion of the object and contacts may be accomplished, also a number of ways in which the test object may be subjected to a magnetizing force.

With reference to the latter, Figures 1, 2 and 3 diagrammatically show different methods for subjecting the test piece to magnetizing forces.

In Figure 1, contacts 15 and 16 form terminals for an electric circuit which may be connected thereto by means of conductors 17 and 18. A test piece 19, in this instance, being an elongated member, is contacted at its ends by the contact members 15 and 16. With this arrangement, it will be evident that if the contacts are now energized from the supply circuit, current will flow longitudinally through the test member and set up an induced magnetic field in the surface thereof. This magnetic field is utilized for disclosing defects in the test object as hereinbefore described.

Figure 2 discloses a somewhat similar arrangement in that the test piece is associated with a conductor carrying current. Instead, however, of clamping the contacts directly to the test piece, which in this instance is disclosed as comprising a gear, the gear is supported on an elongate current carrying member 20 which in turn has its ends engaged by the contacts 15 and 16. With this arrangement, it will be evident that when the contacts are energized from the supply circuit, current will flow through the conductor 20 and induce a circular magnetic field in the test piece 19.

A modified arrangement to that shown in Figure 2 comprises directly clamping the piece to be tested between the contacts 15 and 16, but instead of energizing the contacts, a cable would be connected to the supply circuit and pass through the hub of the gear. The resulting magnetization would in this case also be the same as in the arrangement shown in Figure 2.

On the other hand, as shown in Figure 3, the contacts 15 and 16 instead of being arranged to carry current as in the arrangement just described, are provided with magnetizing coils as shown at 21 and 22 which may be energized to set up a flow of magnetic flux through the test piece 19 having its ends clampingly engaged by the contact pieces. In this arrangement, the test piece forms a part of the magnetic circuit.

As an alternative to providing magnetizing coils on the contact pieces, the same result might be accomplished by surrounding the test piece with a magnetizing coil, as shown in dotted lines at 23.

In the foregoing description of the apparatus, the contact pieces are referred to as being arranged to carry an electrical current after the manner shown in Figures 1 and 2. But, it will be appreciated that these contact pieces may be arranged to carry magnetic flux after the manner shown in Figure 3 without departing from the invention.

With reference to the manner in which the test object is immersed in the liquid bath, this may be accomplished in three different ways, namely, (1), by moving the tank containing the liquid, (2) by raising the level of the liquid in the bath so as to surround the object or (3) by moving the test object so as to bring it into the liquid bath.

The apparatus disclosed in Figures 4, 5 and 6 contemplates an arrangement whereby the tank containing the liquid may be raised and lowered to bring the object into the liquid and remove it therefrom.

More specifically, the apparatus comprises a horizontally disposed base structure 24 having columnar frame structures 25 and 26 disposed at its ends in spaced relation. These columnar structures are each arranged to support an adjustable contact head.

The contact head comprises a bearing block 27 which is secured in position at the top of one of the columns. This block is transversely apertured as shown at 28 to slidingly receive therein a sleeve member 29 which carries a rack 30 on its under side. Meshing with the rack 30 is a gear 31 which is rotatably supported within the block and actuatable by means of a hand wheel 32 disposed outside of the block. Actuation of this hand wheel will axially shift the sleeve relative to the block. The sleeve may be clamped in any adjusted shifted position by means of a pair of clamping members 33 and 34 which are in opposed relation and surround the sleeve. These clamping members are arranged to be actuated into clamped and unclamped relation to the sleeve by means of a manually operable member 35.

A contact supporting arm 36 is slidably mounted for axial movements within the sleeve 29. One end of the arm 36 extends outwardly past the associated end of the sleeve and has supported thereon the contact member 16.

The opposite end of the above sleeve 29 supports a pressure cylinder 37 which is operatively associated with the opposite end of the arm 36, this end of the arm having piston relation with the cylinder.

The contact 15 is likewise supported on a contact arm 36. In the case of this arm, however, instead of its being mounted in an adjustable sleeve having a rack thereon, the rack in this case is formed directly on the bottom of the arm and cooperates in a similar manner with a gear 31. The contact 15 is therefore manually adjustable only, whereas in the case of the contact 16, the contact may be initially adjusted by hand so as to cooperate with contact 15 in engaging the test object. Thereafter the contact pressures may be increased through the agency of the cylinder and piston arrangement associated with the sleeve 29 and contact supporting arm 36 of contact 16.

A fluid such as air is supplied to the pressure cylinder 37 by means of a line 38 which is connected to a suitable source of supply 39 through a control valve 40.

A tank or container 41 is provided for the liquid containing finely divided particles of paramagnetic material, which is to be utilized during the testing of the object. In this form of apparatus, it is proposed to immerse the test object by raising and lowering of the tank with the liquid therein.

In order to accomplish this, the tank 41 is supported on a platform 42 which is carried by a plunger 43 having its uppermost end connected to the platform and its lowermost end in piston relation with a fluid cylinder 44. Control connections are made to this cylinder from the fluid supply 39 through suitable treadle control valves 45 for energizing the cylinder to raise and lower the tank 41, when desired.

The tank 41 is provided with an overflow pipe 46 which is connected through a suitable hose 47 to a small storage tank 48. A pump disposed in this tank is driven by suitable power means such as an electric motor 49 which is connected to an electrical source of supply 50 through a control switch 51.

Since it has been found to be desirable to agitate the liquid containing the paramagnetic particles in suspension, while subjecting the object to the influence of a magnetic field, a plurality of perforated pipes 52 are mounted in the bottom of the tank. These pipes are connected by a hose 53 to the air supply 39, a control valve 54 being provided, whereby the amount of agitation of the liquid may be controlled.

In the testing of an object, it is sometimes desirable to spray the object with the bath liquid. For this purpose, a connection is made to the motor operated pump by means of a hose 55 having a suitable spray nozzle 56 secured thereto, this nozzle preferably being arranged to be opened and closed by means of a valve having a handle 57 by means of which the valve may be actuated.

Lug connections are provided on the contacts 15 and 16 by means of which these contacts may be connected to a suitable source of electric current as by means of conductors 58 and 59. As previously explained, instead of supplying current to the contacts 15 and 16, these contacts may be arranged so as to form part of a magnetizable circuit or path as diagrammatically illustrated in Figure 3.

From the description of the above apparatus, it will be apparent that it is particularly adapted for testing purposes, since each step of the testing may be adjustably and individually controlled, whereby the steps may be varied depending upon the test conditions and the type of defects it is desired to indicate.

Referring to Figures 7 and 8, apparatus is therein disclosed which is of somewhat different construction. In this form of the apparatus, the tank 41 instead of being arranged for raising and lowering movement to submerge the test object in the liquid containing the paramagnetic particles in suspension is permanently mounted in fixed position on a supporting frame structure 60.

The contact head arrangement, in this instance, is provided for manual manipulation only, and instead of providing a pressure cylinder for final contact pressures, a lever 61 is arranged to move the contacts with greater force than may be secured by actuating the hand wheel 32.

This lever is in ratchet connection with a ratchet wheel 62, the ratchet wheel being operatively connected to the rack gear 31.

In order to facilitate the movements of the contact arms 36 by means of the lever 61, the rack 30 is placed on the side of the contact arm so that the hand wheel 32 and lever 61 will be disposed above the head block 27 instead of at one side.

Disposed adjacently to the frame structure 60 is another frame structure 63, which may if desired be constructed as a part of the frame structure 60. The frame structure 63 forms a support for a storage tank 64 which is elevated above the tank 41, and a drain tank 65 which is disposed below the tank 41.

With the foregoing arrangement of tanks, it will be evident that liquid may flow through a feed pipe 66 by gravity into the tank 41, and likewise liquid may be drained from the tank 41 into the drain tank by gravity through outlet pipe 67.

In the operation of this form of the apparatus, the liquid is raised from the drain tank to the storage tank by means of a suitable pump 68 which is disposed in the drain tank and actuated by suitable power means such as an electric motor 69. The pump outlet is connected to a pipe 70 having its uppermost end arranged to discharge the pumped liquid into the storage tank.

The feed pipe 66 and outlet pipe 67 are preferably of relatively large diameter so that liquid may be quickly fed to and drained from the tank 41.

Control of the inlet and outlet of the tank 41 is accomplished by means of quick acting control valves 71 and 72 respectively disposed in the pipe lines 66 and 67.

In this form of the apparatus, the object is submerged by raising and lowering of the level of the liquid in the tank 41 by the proper actuation of control valves 71 and 72.

In Figures 9, 10 and 11, I have shown another form of apparatus for carrying out the method of my invention, wherein the test object is submerged in the liquid bath by moving the object rather than varying the level of liquid in the tank or by raising and lowering of the tank to submerge the object. It will be apparent that the object might be vertically moved into and out of the tank or might be swingably moved to carry the object into the tank liquid. The latter arrangement is preferred, since the apparatus may be more simply constructed and its cost kept at a lower figure.

This form of the apparatus is particularly adapted for use in connection with a testing table, and I have chosen to disclose the same as forming a part of such a table.

The tank 41 is built into the test table top 73 between spaced apart aligned frame members 74 and 75 which may be supported in an upright position on the table.

Extending between the uprights 74 and 75 is a rail member 76 having end pieces 77 and 78 fixedly secured thereto. These end pieces and rail are pivotally mounted as a unit at the uppermost end portions of the uprights 74 and 75.

The contacts 15 and 16 are respectively supported on arms 79 and 80 which are associated at one end with the rail 76. The arm 79 is secured to the rail and forms a fixed contact support. The arm 80, however, is arranged to slidably move on the rail 76 so that the contact 16 may be moved toward or away from contact 15. The arms 79 and 80 are disposed in the same plane and these arms project substantially at right angles to the rail 76 and the plane of end pieces 77 and 78. For moving the contact 16 toward and away from contact 15, a flexible connection is made with contact arm 80 by means of a looped chain 81 which is trained around sprocket wheels 82 and 83 supported respectively on suitable brackets on the end pieces 77 and 78. The sprocket wheels support the chain in two parallel extending loop forming portions which are in parallel with the rail 76. One of these portions, in this instance, the lowermost portion is connected to the arm 80. By driving one of the sprocket wheels, in this instance the sprocket wheel 83, by means of a worm gear connection 84 which is actuated by a suitable electric motor 85, the arm 80 may be moved in one direction or the other on the rail 76, as desired. The motor and worm gear drive are mounted on the end piece 78.

In this form of the apparatus, the fixed contact 15 is connected to one line of the electrical supply source. Electrical connection to the movable contact 16 is accomplished through a trolley 86 which is carried by the arm and arranged to make contact with a trolley bus 87 which may be insulatingly supported at one end on the arm 79 and at its other end on end piece 78 by means of a suitable bracket 88. The other conductor 59 of the electrical source is connected to the trolley bus at one end so as not to interfere with the travel of the trolley contact 86.

For rotating the rail 76 and the end pieces 77 and 78 together with the parts carried thereby, a gear 89 is connected to one end of the rail 76. This gear meshes with a segmental gear 90 which is arranged to be actuated by means of an elongate lever 91. By manually swinging this lever in a clockwise direction, the contacts 15 and 16 with the test object supported thereby may be swung into the tank 41 to immerse the object. Of course, movement of the lever 91 in a counterclockwise direction as viewed in Figure 11 will operate to move the contacts out of the liquid to expose the test object.

A removable pin 92 is provided to form a stop so that when the lever 91 has been moved to proper position to bring the contacts out of the liquid, this pin may be inserted in a suitable hole in the upright 75 so as to form an abutment and prevent movement of the contacts back into the liquid by virtue of their inherent weight.

Although not shown, it is desirable to provide suitable limit switches for limiting the travel of arm 80 along rail 76. If desired, a panel or upright 93 may be provided at one end of the table for control switches and the like for use in connection with this apparatus.

From the foregoing description, it will be apparent that the present invention provides novel means for testing paramagnetic materials, which may be embodied in several different forms of apparatus; which apparatus is provided with novel means for contacting and supporting the test object; which includes improved means for applying a final contact pressure to the contacts; which includes novel arrangements for immersing the test object in a liquid bath; and which embodies improved means for subjecting the test object to circular magnetization.

It is, of course, to be understood that although I have described in detail several embodiments of my invention, the invention is not to be thus limited, but only insofar as defined by the scope and spirit of the appended claims.

I claim as my invention:

1. In a device of the character described for testing a metallic object, a pair of head members mounted for unitary swinging movement, means for actuating said head members towards each other into contact engagement with said object, said members being arranged to form a part of a path for the flow of a magnetic field producing energy, a receptacle disposed adjacent said members adapted to contain a liquid having finely divided particles of paramagnetic material therein, and means for swinging the head members to move the object and the contacting portions of the head members into the liquid in said receptacle.

2. An apparatus for testing a metallic object comprising head members having portions arranged to cooperatively clampingly engage the object and support it in test position, a receptacle adapted to contain a liquid having finely divided particles of paramagnetic material therein, means for raising and lowering the receptacle to dispose the object and the clamping portions of the head members in the liquid and remove them therefrom, and means for subjecting the object to a magnetic field while in the liquid.

3. Apparatus for testing a metallic object comprising means for supporting the object in test position, a receptacle having the object disposed therein, said receptacle being adapted to contain a liquid having finely divided particles of paramagnetic material therein and surround said object, means for subjecting the object to the influence of a magnetic field while in said liquid, and means for forcing air through the liquid for agitating the same during subjection of the object to the influence of said magnetic field.

4. In an apparatus of the character described, a pair of head members adapted to receive the test object therebetween, said members being mounted for relative movement toward and away from each other, manually operable means for relatively moving the members to initially contact the object, and power means operable to relatively move the members independently of the manually operable means.

5. In an apparatus of the character described having an adjustable head adapted to be moved into and out of engagement with an object, a sleeve supported for axial movements, an elongate member supported in said sleeve for axial movements therein, one end of said member extending beyond the sleeve and having the head secured thereto, piston means associated with said member, fluid pressure cylinder means carried by said sleeve operatively associated with the piston means whereby the member may be moved relative to the sleeve, and means for moving the sleeve and member as a unit.

6. Testing apparatus of the character described comprising a pivotally mounted frame structure, a pair of object engaging members carried by said structure arranged for relative movement toward and away from each other, a tank adapted to receive said members when the frame is pivoted, means for relatively moving said members, and means for pivoting said frame to bring the members into and out of the tank.

7. Testing apparatus of the character described comprising a frame structure pivoted at its ends for swinging movement and including an elongate rail member, a fixed contact piece supported on said rail, a movable contact piece slidably guided and supported on said rail, means for shifting the movable contact piece along said rail to move it toward and away from the fixed contact, whereby a test piece may be gripped and ungripped, a bus supported on said frame, collector means electrically connecting the movable contact piece with said bus, means for connecting an electric circuit to the bus and fixed contact piece, a tank disposed adjacent the frame structure, and means for swinging the frame structure to position the contact pieces and test object in the tank.

ALFRED V. DE FOREST.